United States Patent [19]

Ishii

[11] Patent Number: 4,879,649
[45] Date of Patent: Nov. 7, 1989

[54] TRANSACTION PROCESSING APPARATUS HAVING PLU FUNCTION

[75] Inventor: Hiroaki Ishii, Ootsu, Japan

[73] Assignee: Omron Tateisi Electronics Co., Kyoto, Japan

[21] Appl. No.: 147,728

[22] Filed: Jan. 25, 1988

[30] Foreign Application Priority Data

Jan. 28, 1987 [JP] Japan .................................. 62-17801
Apr. 16, 1987 [JP] Japan .................................. 62-93982

[51] Int. Cl.$^4$ ............................................. G07G 1/12
[52] U.S. Cl. .................................................. 364/405
[58] Field of Search ................. 364/405, 404; 235/378

[56] References Cited

U.S. PATENT DOCUMENTS

| 4,389,707 | 6/1983 | Tsuzuki | 364/405 |
| 4,649,481 | 3/1987 | Takahashi | 364/405 |
| 4,707,785 | 11/1987 | Takagi | 364/405 |
| 4,757,448 | 7/1988 | Takagi | 364/405 |

FOREIGN PATENT DOCUMENTS

| 176072 | 3/1986 | European Pat. Off. | 364/405 |
| 187523 | 7/1986 | European Pat. Off. | 364/405 |

Primary Examiner—Jerry Smith
Assistant Examiner—Steven G. Kibby
Attorney, Agent, or Firm—Stevens, Davis, Miller & Mosher

[57] ABSTRACT

A memory (9) in a transaction processing apparatus comprises a unit price data storage area 91 for storing PLU codes and unit price data corresponding to the PLU codes in addition to a PLU file (4). A CPU (5) in the transaction processing apparatus accesses the unit price data storage area (91) when a PLU code is entered from a keyboard (6), determines whether or not the same code as the entered PLU code exists in the unit price data storage area (91) and then, reads out data from the PLU file (4) in response to the PLU code. If and when the same PLU codes as the entered PLU code exists in the unit price data storage area (91), the CPU (5) registors data excluding the unit price data, of the data read out from the PLU file (4) and the unit price data corresponding to the PLU code stored in the unit price data storage area (91). On the other hand, if the same PLU code as the entered PLU code does not exist in the unit price data storage area (91), the PLU code and the unit price data, of the data read out from the PLU file (4) are stored in the unit price data storage area (91) and the data read out from the PLU file (4) is registered.

5 Claims, 5 Drawing Sheets

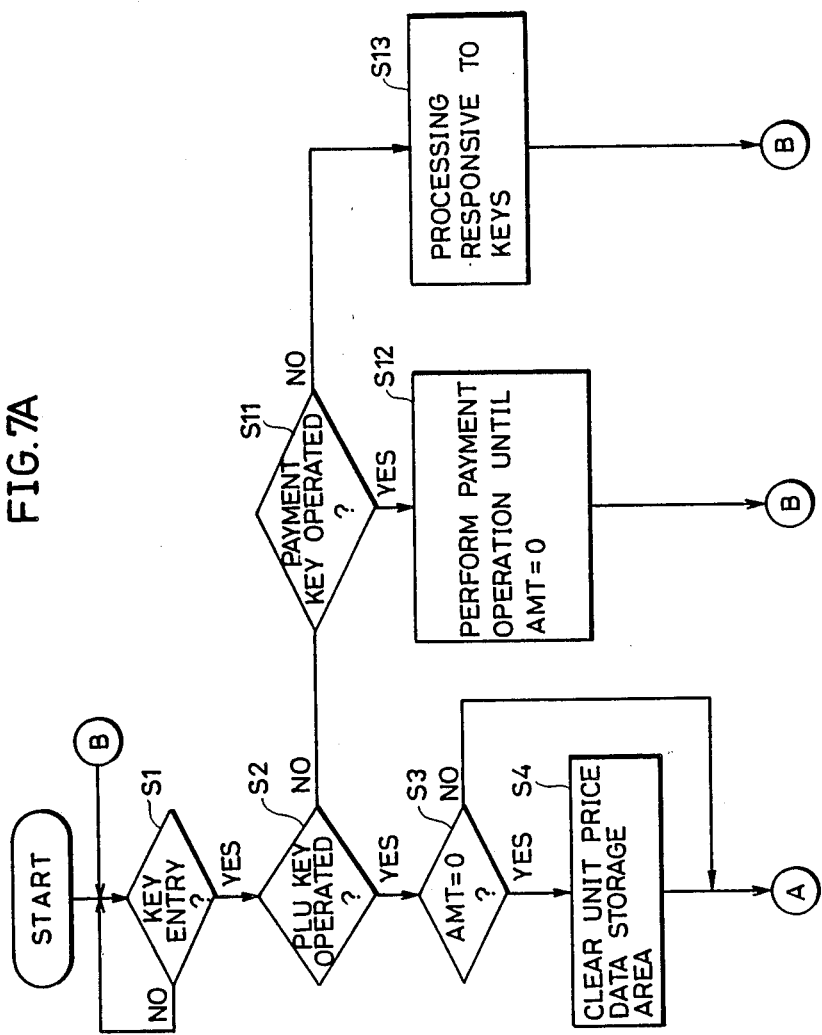

TRANSACTION PROCESSING APPARATUS HAVING PLU FUNCTION

BACKGROUND OF THE INVENTION

1. Field of the Invention

The present invention relates to a transaction processing apparatus and more particularly, to a transaction processing apparatus in which data concerning commodities including price data can be registered only by entering commodity identification data.

2. Description of the Prior Art

An electronic cash register (referred to as ECR hereinafter) having a so-called PLU (Price Look Up) function has been widely used. In order to achieve the PLU function, a PLU file is prepared in advance comprising PLU codes (commodity identification codes) and data concerning commodities such as unit price corresponding to the PLU codes, and when the PLU codes are entered from the keyboard or bar codes attached to the commodities are read out by a scanner, unit price data stored in the PLU file are read out from the PLU file and registered.

In a store such as a supermarket, price units registered in a PLU file are changed, a few times a day, for discount purposes, for example. If such a situation occurs during one transaction of one customer, the unit price corresponding to the identical commodity code such as PLU code "01" is differently printed out on a receipt, e.g., " ¥300.-" and " ¥200.-", as shown in FIG. 1.

SUMMARY OF THE INVENTION

A primary object of the present invention is to provide a transaction processing apparatus in which if the identical commodities are registered a plurality of times during one transaction, the identical commodities can be registered at the identical unit price even if the unit price of the commodities is changed during the transaction.

Briefly stated, according to the present invention, there is provided storing means capable of storing commodity identification data and unit price data corresponding to the commodity identification data in addition to a file having a commodity identification data and data concerning commodities corresponding to the commodity identification data stored in advance and the storing means is accessed in response to commodity identification data every time the commodity identification data is entered so that it is determined whether or not the unit price data corresponding to the commodity identification data is stored in the storing means. If and when the unit price data corresponding to the entered commodity identification data is not stored in the storing means, the data concerning commodities corresponding to the commodity identification data are read out from the file and stored in the storing means and the data concerning commodities read out from the file is registered. On the other hand, if the unit price data corresponding to the entered commodity identification data is stored in the storing means, the unit price data corresponding to the commodity identification data stored in the storing means and data, excluding the unit price data, of data concerning commodities corresponding to the commodity identification data stored in the file are registered.

According to the present invention, even if the unit price data stored in advance in the file is changed during one transaction, the original (un-changed) unit price data can be registered.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are flowcharts for explaining operation according to an embodiment of the present invention.

DESCRIPTION OF THE PREFERRED EMBODIMENT

In the following embodiment, an ECR will be described as a transaction processing apparatus. However, the invention is not intended to be limited to an ECR. The present invention can be applied to various transaction processing apparatuses used for a transaction.

Figure 2:
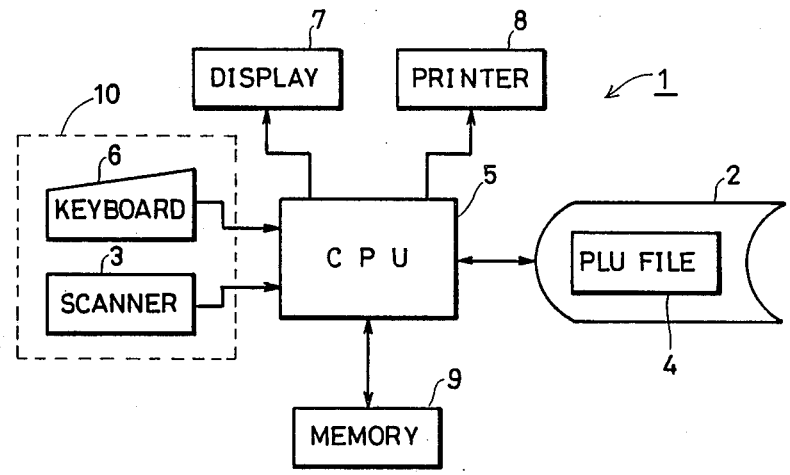
FIG. 2 is a schematic block diagram showing an electrical structure of an ECR according to an embodiment of the present invention.

FIG. 2 is a schematic block diagram showing an electrical structure of an ECR according to an embodiment of the present invention. Referring to FIG. 2, an external memory apparatus such as a floppy disk 2 is connected to an ECR 1. A PLU file 4 is stored in the floppy disk 2. The PLU file 4 comprises at least PLU codes (commodity identification data) depending on commodities, data concerning commodities corresponding to each of the PLU codes such as unit price data and commodity name data, as will be described in FIG. 5.

Furthermore, the ECR 1 comprises a CPU (Central Processing Unit) 5. In addition to the above described floppy disk 2, entering means 10 including a scanner 3 and a keyboard 6, a display 7, a printer 8 and a memory 9 are connected to the CPU 5. The scanner 3 reads out a bar code attached to a commodity. The keyboard is for entering the PLU code of a commodity to which a bar code is not attached. The PLU code may be read by the scanner 3 and thereby entered. In addition, the PLU code may be entered from the keyboard 6. Every time the PLU code is entered, the PLU code and the unit price data are displayed by the display 7. The PLU code and the unit price data are printed on a receipt by the printer 8.

Figures 4, 5:
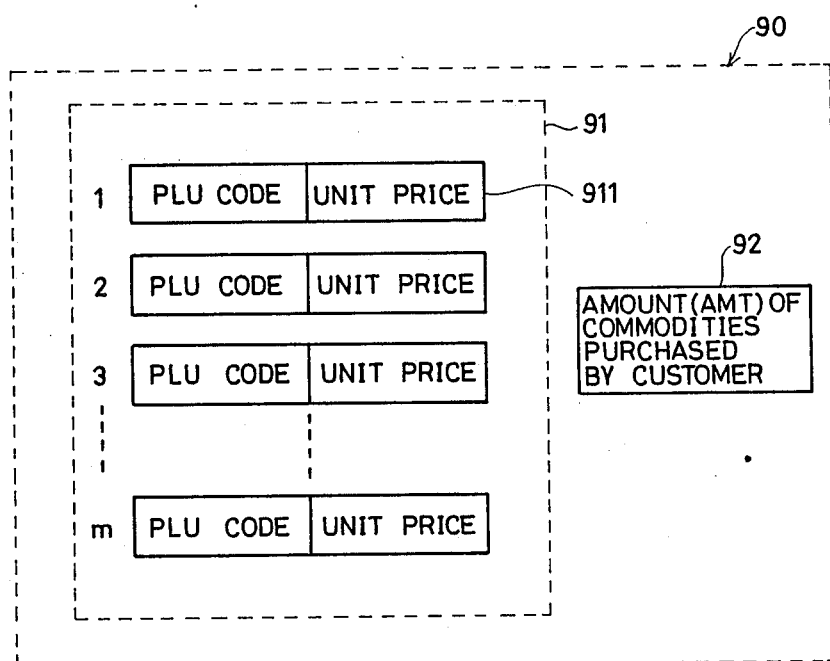
FIG. 4 is a diagram showing diagrammatically a storage area of part of a memory shown in FIG. 2.
FIG. 5 is a diagram showing diagrammatically a PLU file shown in FIG. 2.
Figure 7B:
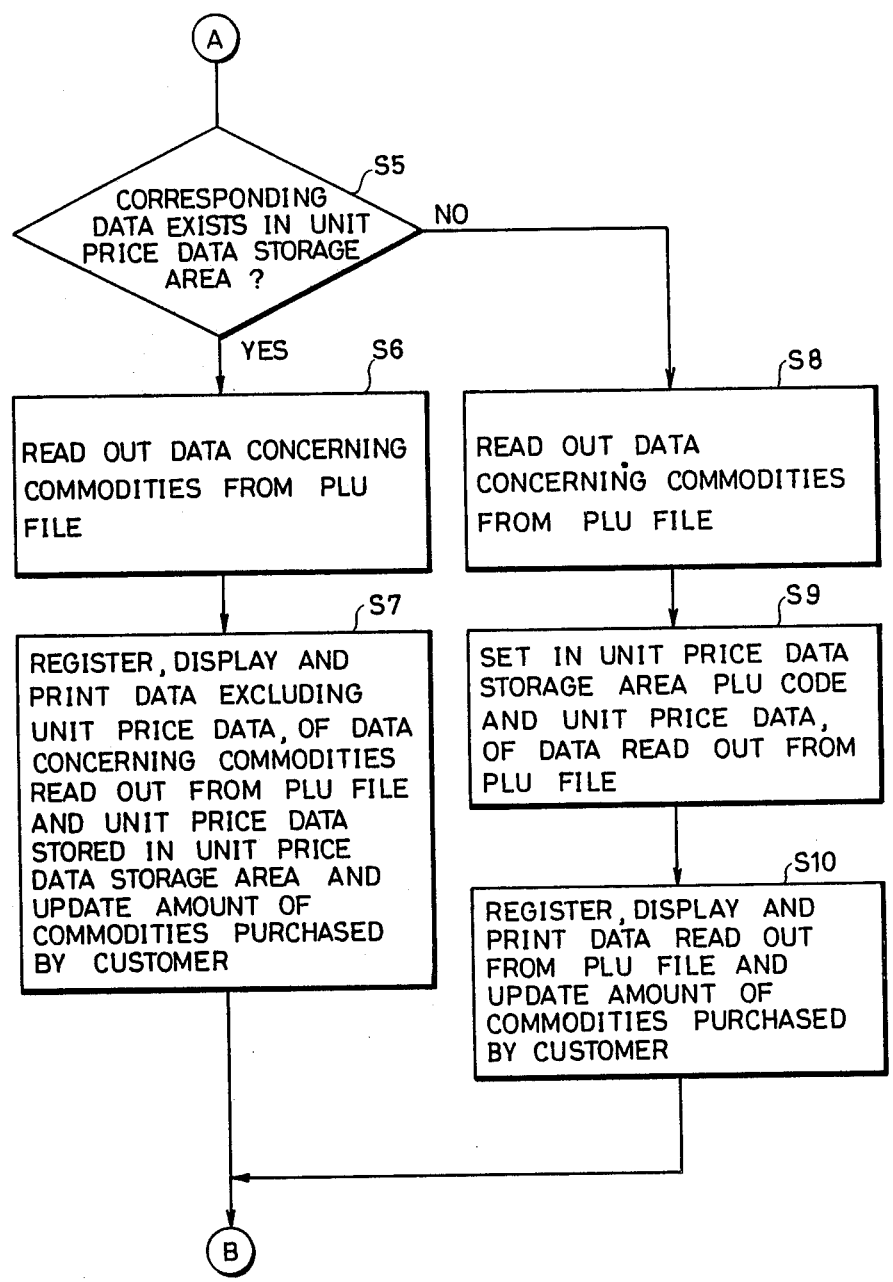

The memory 9 serving as storing means comprises a RAM including a storage area capable of storing the PLU codes and the unit price data corresponding to the PLU codes, as described in FIG. 4 and a ROM storing an operation program of the CPU 5 based on a flowchart shown in FIGS. 7A and 7B.

Figure 3:
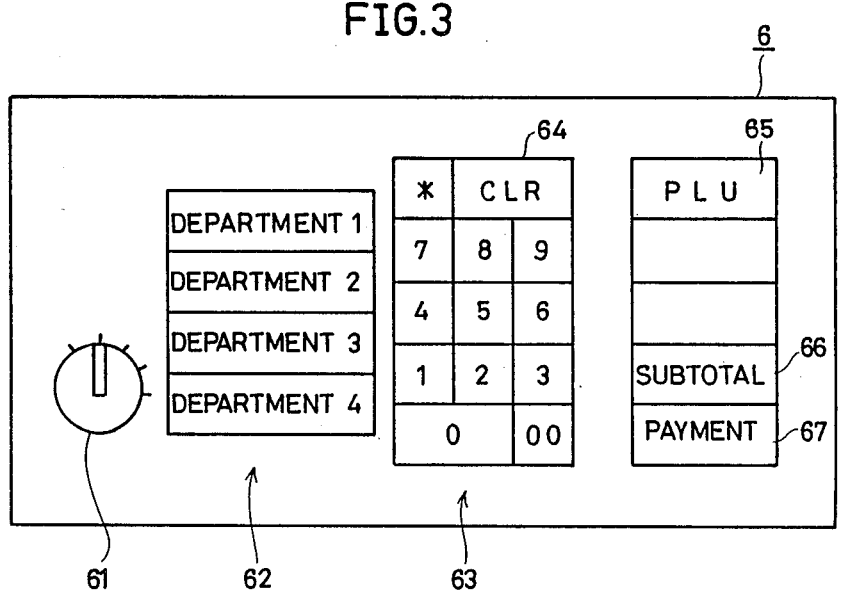
FIG. 3 is a diagram showing a key arrangement of a keyboard shown in FIG. 2.

FIG. 3 is a diagram showing a key arrangement of the keyboard shown in FIG. 2. Referring to FIG. 3, a keyboard 6 comprises a mode selecting switch 61, a department selecting key 62, a numeric key 63, a clear key 64, a PLU key 65, a subtotal key 66, a payment key 67 and the like. The mode selecting switch 61 selects one of a register mode for registration, a set mode for updating data of the PLU file and the like. The department selecting key 62 is used for entering department codes of commodities. The numeric key 63 is used for entering the PLU codes and the like. The clear key 64 is operated when numeric data entered from the numeric key 63 are corrected. The PLU key 65 is operated subsequently to operation of the numeric key 63 when the PLU code is entered. The subtotal key 66 is operated for calculating a total amount and displaying the same when registration is completed. The payment key 67 is operated when the amount received from a customer is entered at the time of payment.

FIG. 4 is a diagram showing diagrammatically a storage area in a part of a memory shown in FIG. 2. Referring to FIG. 4, a storage area 90 comprises a storage area 91 for storing unit price data and a storage area 92 for storing an amount of commodities purchased by a customer. The unit price data storage area 91 comprises, for example, m areas 911. In each of the areas 911, a PLU code and unit price data corresponding to the PLU code are stored, which were read out from the PLU file 4 at the time of registration. The data stored in the unit price data storage area 91 are cleared when registration is started for the next customer. The number m of the areas 911 is suitably selected depending on the kinds of the transaction.

At the time of a transaction, an amount (AMT) of the commodities purchased by a customer is stored in the storage area 62. At the time of payment, the paid amount is subtracted from the amount of the commodities purchased by the customer.

FIG. 5 is a diagram showing diagrammatically the PLU file shown in FIG. 2. Referring to FIG. 5, data concerning n commodities (n coincides with and is almost equal to the number of the kinds of commodities to be registered) are stored in the PLU file 4. Each data concerning each commodity comprises a PLU code, unit price data and the other data such as a commodity name. The unit price data stored in the PLU file 4 can be changed by operating a master ECR or a host computer not shown connected to the PLU file 4.

Figure 1:
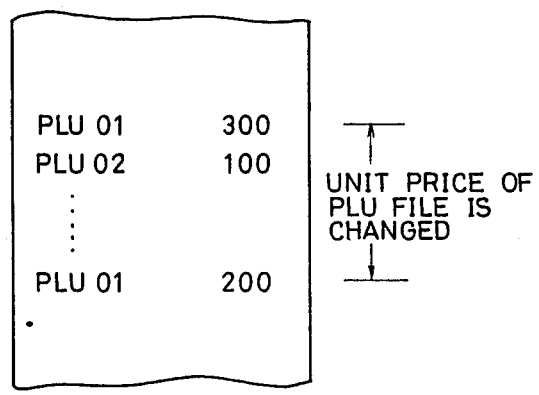
FIG. 1 is a diagram showing a receipt issued by a conventional ECR.
Figure 6:
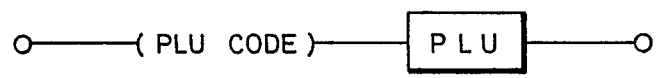
FIG. 6 is a diagram showing key operation at the time of entering a PLU code using a keyboard shown in FIG. 3.

FIG. 6 is a diagram showing key operation for entering a PLU code using a keyboard shown in FIG. 3. First, the numeric key 63 is operated so that the PLU code is entered and then, the PLU key 65 is repressed.

FIGS. 7A and 7B are flowcharts for explaining the operation of an embodiment of the present invention. Referring now to FIGS. 2 to 7B, operation according to an embodiment of the present invention is described in detail.

An operator registers information as to a commodity purchased by a customer. For such registration, the operator performs the key operation show in FIG. 6 to enter the PLU code. In the step S1, the CPU 5 in the ECR 1 waits until key entry is provided. If the key entry is provided, the step S1 proceeds to the step S2. In the step S2, it is determined whether or not the PLU key 65 was operated. If the PLU key 65 is not operated, it is determined whether or not the payment key 67 was operated, in the step S11. If the payment key 67 is not operated, processing corresponding to the operated key is performed, in the step S13. If the PLU code is entered, the step S2 proceeds to the step S3. In the step S3, it is determined whether or not the amount AMT of commodities purchased by a customer is "0". At the time point when the operator starts registration, the amount AMT is "0", so that the step S3 proceeds to the step S4, where the CPU clears the unit price data storage area 91 in the memory 9. In the step S5, it is determined whether or not the same PLU code as the entered PLU code exists in the unit price data storage area 91. At the beginning of registration, since no data is stored in the unit price data storage area 91, the step S5 proceeds to the step S8. In the step S8, the CPU 5 reads out data concerning commodities corresponding to the PLU code from the PLU file 4. In the step S9, the CPU 5 sets in an empty area of the storage area 91 the PLU code and the unit price data, of data concerning commodities read out from the PLU file 4. Subsequently, in the step S10, the CPU 5 registers the data concerning commodities read out from the PLU file 4, displays the same by the display 7 and prints the same by the printer 8 and adds the registered unit price data to the amount of the commodities purchased by a customer (originally "0") stored in the amount storage area 92 so that the amount of the commodities purchased by a customer is updated.

Description is now made of an operation which occurs when the same data as the registered data concerning commodities is registered. More specifically, the operator enters the PLU code and operates the PLU key 65. Correspondingly, the step S1 proceeds to the step S3 through the step S2. In the step S3, since the amount AMT is not "0", the step S4 is skipped to the step S5. It is determined in the step S5 that the same PLU code as the entered PLU code exists in the unit price data storage area 91. Thus, in this case, the step S5 proceeds to the step S6, where the CPU 5 reads out data concerning commodities corresponding to the PLU code from the PLU file 4. Subsequently, in the step S7, the CPU 5 registers data excluding the unit price data of the data concerning the commodities read out from the PLU file 4 and the unit price data read out from the unit price data storage area 91, displays the same by the display 7 and prints the same by the printer 8 adds as the unit price data to the amount AMT stored in the amount storage area 92 so that the amount of the commodities purchased by a customer is updated.

The above described operation is repeated until registration of all of the commodities is completed. Then, the operator represses the subtotal key 66. At that time, the amount of commodities purchased by a customer is displayed by the display 7. The customer sees the amount displayed by the display 7, prepares cash for payment and hands the same to the operator. The operator enters from the ten-key 63 the amount of cash received from the customer and then, depresses the payment key 67. Accordingly, when it is determined in the step S11 that the payment key 67 was operated, a payment operation is performed in the step S12. More specifically, the paid amount as entered is subtracted from the amount data stored in the amount storage area 92. For example, it is assumed that the customer pays a part of the amount by a credit card and the remainder by cash. When a part of the amount is paid by a credit card, the remainder is stored in the amount storage area 92 and when cash corresponding to the remainder is paid, "0" is stored in the storage area 92. Thus, at this time point, the amount AMT becomes "0". When the payment operation is completed, one transaction is completed, so that registration becomes possible for the next customer.

As described in the foregoing, if and when unit price data concerning commodities to be registered exists in the unit price data storage area 91, the unit price data is registered, consequently, even if the unit price data concerning commodities stored in the PLU file 4 is changed in response to a command from the master ECR or the host computer during registration for one customer, the original (un-changed) unit price data can be registered.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transaction processing apparatus comprising:
    first means for storing in advance and respectively for each commodity, commodity identification data and other commodity data corresponding to the commodity identified by the commodity identification data, said other commodity data including unit price data,
    second means for storing commodity identification data and corresponding unit price data,
    means for entering commodity identification data,
    means responsive to the entry of the commodity identification data with said entering means for registering the data concerning a commodity corresponding to the entered commodity identification data,
    means for determining whether or not the unit price data corresponding to the entered commodity identification data is already stored in said second storing means each time the commodity identification data is entered with said entering means, and
    control means responsive to a determination by said determining means that the unit price data entered by said entering means is not stored in said second storing means for reading out from said first storing means the data concerning commodities corresponding to the commodity identification data entered with said entering means and storing the entered commodity identification data and the data concerning commodities corresponding to the entered commodity identification data in said second storing means and for registering the data concerning commodities read out from said first storing means with said registering means, and responsive to a determination by said determining means that the unit price data corresponding to the commodity identification data entered with said entering means is stored in said second storing means for registering the unit price data corresponding to the commodity identification data stored in said second storing means and data, excluding the unit price data, concerning commodities corresponding to the entered commodity identification data which is stored in said first storing means.

2. A transaction processing apparatus according to claim 1, wherein said entering means comprises a key entering portion for entering commodity identification data by key operation.

3. A transaction processing apparatus according to claim 1, wherein said entering means comprises a reading portion for reading and entering commodity identification data attached to commodities.

4. A transaction processing apparatus according to claim 1, wherein said registering means includes means for accumulating the unit price data for calculating the amount of the commodities purchased by a customer and further comprises erasing means for erasing the contents stored in said second storing means when the amount is paid.

5. A transaction processing apparatus according to claim 1 wherein said first storing means stores a data file comprising at least a plurality of commodity identification codes, a plurality of unit prices respectively associated with said plurality of commodity identification codes, and a plurality of other data also respectively associated with said plurality of commodity identification codes.

* * * * *